United States Patent
Wang

[11] Patent Number: 6,126,777
[45] Date of Patent: Oct. 3, 2000

[54] AQUEOUS SILANE ADHESIVE COMPOSITIONS

[75] Inventor: Zhiqiang Wang, Erie, Pa.

[73] Assignee: Lord Corporation, Cary, N.C.

[21] Appl. No.: 09/027,421

[22] Filed: Feb. 20, 1998

[51] Int. Cl.[7] .................................................. C09J 5/02
[52] U.S. Cl. ................................ 156/307.5; 106/287.15;
  106/287.25; 156/326; 428/424.7; 428/425.5
[58] Field of Search ................................ 156/326, 307.5;
  428/424.7, 425.5; 106/287.5, 287.25

[56] References Cited

U.S. PATENT DOCUMENTS

| | | |
|---|---|---|
| 2,979,420 | 4/1961 | Harper . |
| 3,022,196 | 2/1962 | Jenkins et al. . |
| 3,278,333 | 10/1966 | Titzmann et al. ............... 156/307.5 |
| 3,398,043 | 8/1968 | Youngs ............................. 428/425.5 |
| 3,678,003 | 7/1972 | Kaiser et al. . |
| 4,031,120 | 6/1977 | Gervase . |
| 4,106,948 | 8/1978 | Cooper et al. ................... 106/287.15 |
| 4,179,537 | 12/1979 | Rykowski ......................... 156/326 |
| 4,308,071 | 12/1981 | Gervase . |
| 4,433,095 | 2/1984 | Hombach et al. . |
| 4,618,389 | 10/1986 | Agodoa . |
| 4,652,664 | 3/1987 | Singer et al. . |
| 4,663,377 | 5/1987 | Hombach et al. . |
| 4,690,966 | 9/1987 | Rende, Jr. . |
| 4,895,921 | 1/1990 | Schäfer et al. . |
| 4,921,987 | 5/1990 | Hitze et al. . |
| 5,157,074 | 10/1992 | Metzger et al. . |
| 5,178,675 | 1/1993 | Sexsmith . |
| 5,185,200 | 2/1993 | Tirpak et al. . |
| 5,191,012 | 3/1993 | Markusch et al. . |
| 5,200,489 | 4/1993 | Jacobs et al. . |
| 5,252,696 | 10/1993 | Laas et al. . |
| 5,296,160 | 3/1994 | Tirpak et al. . |
| 5,354,807 | 10/1994 | Dochniak . |
| 5,532,314 | 7/1996 | Sexsmith . |

FOREIGN PATENT DOCUMENTS

| | | |
|---|---|---|
| 0 592 138 A1 | 9/1993 | European Pat. Off. . |
| 0 721 001 A1 | 7/1996 | European Pat. Off. . |
| 0 842 991 A1 | 5/1998 | European Pat. Off. . |
| 002104490 | 10/1991 | Japan . |
| 002104489 | 10/1995 | Japan . |

*Primary Examiner*—John J. Gallagher
*Attorney, Agent, or Firm*—Wayne W. Rupert

[57] ABSTRACT

An aqueous adhesive composition includes at least one vinyl silane and at least one water dispersible polyisocyanate. The aqueous adhesive composition exhibits low VOC emissions and can be used to bond vulcanizable rubbers to a variety of substrates.

19 Claims, No Drawings

AQUEOUS SILANE ADHESIVE COMPOSITIONS

FIELD OF THE INVENTION

This invention relates to adhesive compositions, and in particular to aqueous adhesive compositions for bonding elastomers to a substrate.

BACKGROUND OF THE INVENTION

Adhesive compositions are widely used to bond elastomeric materials, including vulcanizable elastomeric materials, to a variety of substrates. Generally, adhesives known to be effective as rubber-to-metal bonding agents can be limited with regard to the type of elastomer to be bonded. In addition, adhesive compositions that effectively bond sulfur-cured elastomeric materials, such as natural rubber compositions, do not necessarily exhibit the same level of performance when used to bond specialty elastomers, such as silicone rubbers.

Silane adhesive compositions have been developed to bond elastomeric materials, particularly silicon elastomer-based materials, to various substrates. Many silane adhesive compositions rely on organofunctional silanes as the active bonding agent. Due to the moisture sensitive nature of the organofunctional silane compounds, traditional silane adhesive compositions have relied on organic solvents to form a stable and workable solution. See for example, U.S. Pat. Nos. 4,308,071 and 4,031,120 to Gervase; U.S. Pat. No. 4,618,389 to Agodoa; U.S. Pat. No. 3,678,003 to Kaiser; U.S. Pat. No. 3,022,196 to Jenkins et al.; and U.S. Pat. No. 4,690,966 to Rende, Jr. However, there are increasing environmental concerns associated with the use of solvent-based systems.

Attempts have been made to provide aqueous silane adhesive systems. See for example, U.S. Pat. No. 2,979,420 to Harper; U.S. Pat. Nos. 5,532,314 and 5,178,675 to Sexsmith; and U.S. Pat. No. 4,921,987 to Hitze et al. However, many aqueous systems can suffer from low bond strength, short shelf life, and other characteristics which are disadvantageous in the production of vulcanizable elastomer/substrate articles and other products.

SUMMARY OF THE INVENTION

The present invention provides aqueous silane adhesive compositions useful for bonding elastomeric materials, including silicone rubbers, to a substrate. The aqueous adhesive compositions of the present invention can be used with a variety of substrates, such as metallic, ceramic, glass, and textile substrates, and the like. The adhesives of the invention are aqueous systems and thus can be more environmentally acceptable, as compared to solvent-based systems. Despite the aqueous nature of the adhesive of the invention, however, the adhesive compositions can exhibit good shelf stability for up to about six months and longer. Further, the adhesive compositions of the invention exhibit good bond strength.

The aqueous adhesive compositions of the invention include an organosilane and a water dispersible polyisocyanate in water. Preferred organosilanes include vinyl silanes. The organosilane is present in the adhesive composition of the invention in an amount from about 10 to about 90, preferably about 40 to about 80, percent by weight, based on the total weight of the solid components of the composition.

Organosilanes such as vinyl silanes are known in the art to be water insoluble and unstable in aqueous solutions. However, the water dispersible polyisocyanate of the aqueous compositions can disperse and stabilize the organosilane in the aqueous phase. The water dispersible polyisocyanate is preferably an aliphatic or cycloaliphatic polyisocyanate or an adduct thereof. In an especially preferred embodiment of the invention, the water dispersible isocyanate is a methyl ethyl ketone oxime-blocked hexamethylene diisocyanate-based polyisocyanate. The water dispersible polyisocyanate is present in the adhesive composition of the invention in an amount from about 90 to about 10, preferably about 60 to about 20, percent by weight, based on the total weight of the solid components of the composition.

Various additives such as fillers, pigments, dispersion aiding agents, viscosity controlling agents, acid scavengers, coating agents, and the like, may also be included in the adhesive compositions in proportions known in the art. The total solids content of the adhesive of the invention is from about 1 and 30 percent, and preferably from about S and about 20 percent.

The aqueous adhesive composition has marked advantages over currently available adhesives. The adhesives have great versatility, being capable of bonding a wide variety of substrates including metallic, ceramic, glass, and organic substrates. Such substrates can be bonded using the aqueous adhesive compositions of the invention to a variety of vulcanizable elastomers, and is particularly useful for bonding metal substrates to silicone rubbers.

The present invention also includes articles which include a vulcanized elastomeric portion adhesively bonded to a surface of a substrate by the aqueous adhesive composition of the invention, as well as processes for bonding a vulcanizable elastomer rubber to the surface of a substrate.

DETAILED DESCRIPTION OF THE INVENTION

As stated above, the aqueous adhesive compositions of the present invention comprise at least one organosilane and at least one water dispersible polyisocyanate. The organosilane components can be broadly described as organosilane compounds capable of undergoing the hydrolytic reactions typical of alkyl esters of silicic acid. The organosilanes useful in the invention further preferably include an alpha-olefin unsaturated bond such that the compounds are capable of undergoing free radical reactions.

Preferred organosilanes include vinyl silanes represented by the formula

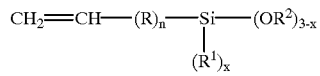

wherein:

R is divalent aliphatic, cycloaliphatic or aromatic radical having from 1 to 20 carbon atoms, and is preferably selected from the group consisting of C1–C4 alkylene, C4–C7 cycloalkyl, and C6–C14 aryl, optionally substituted with one or more C1–C4 alkyl, and n is 0 or 1;

$R^1$ is a monovalent aliphatic, cycloaliphatic or aromatic radical having from 1 to 20 carbon atoms, and is preferably selected from the group consisting of C1–C4 alkyl, C4–C7 cycloalkyl, and C6–C14 aryl, optionally substituted with one or more C1–C4 alkyl;

$R^2$ is a monovalent aliphatic, cycloaliphatic or aromatic radical containing from 1 to 8 carbon atoms and is preferably selected from the group consisting of C1–C4 alkyl, —R³—O—R⁴— and —C(O)—R⁴, wherein R³ is C1–C4 alkylene and R⁴ is C1–C4 alkyl; and x is zero or 1 and preferably is zero.

Exemplary organosilanes include without limitation vinyltrimethoxysilane, vinyltriethoxysilane, vinyltripropyoxysilane, vinyltributoxysilane, vinylmethyldimethoxysilane, vinylmethyldiethoxysilane, vinylethyldimethoxysilane, vinylethyldiethoxysilane, vinylphenyldimethoxysilane, vinylphenyldiethoxysilane, vinylcyclohexyldimethoxysilane, 2-propenyltrimethoxysilane, 2-propenyltriethoxysilane, 2-propenylmethyldiethoxysilane, 2-propenylmethyldimethoxysilane, 2-propenylphenyldiethoxysilane, 2-propenylcyclohexyldimethoxysilane, 3-butenyltrimethoxysilane, 3-butenyltriethoxysilane, 4-pentenyltriethoxysilane, 4-pentenyltrimethoxysilane, 5-hexenetrimethoxysilane, 5-hexenemethyldimethoxysilane, and the like and mixtures thereof. A currently preferred organosilane is vinyltriethoxysilane.

The organosilane is present in the composition in an amount from about 10 to about 90, preferably about 40 to about 80, percent by weight based on the total weight of the solids of the composition.

(Water dispersible polyisocyanates are known in the art and include those derived from monomers corresponding to the formula R(NCO)$_n$, wherein R represents an aliphatic hydrocarbon radical containing 4 to 18 carbon atoms or a cycloaliphatic hydrocarbon radical containing 5 to 15 carbon atoms, and n is 1 to 3. It is also possible, although not preferred, to use polyisocyanates wherein R is an aromatic hydrocarbon radical containing 6 to 40 carbon atoms or an araliphatic hydrocarbon radical containing 7 to 40 carbon atoms, provided the aromatic polyisocyanate can form a stable dispersion in water.

Also suitable are polyisocyanate adducts containing urea, biuret, urethane, allophanate, uretdione, carbodiimide, oxadiazinetrione and isocyanurate groups. These adducts may be prepared from polyisocyanates such as set forth above by known methods. It is also possible to use mixtures of any of these polyisocyanates and/or polyisocyanate adducts.

Examples of suitable monomers of the polyisocyanates include, but are not limited to, 1,4-diisocyanatobutane, 1,5-diisocyanato-2,2-dimethylpentane, 2,2,4- and 2,4,4-trimethyl-1,6-diisocyanatohexane, 1,10-diisocyanatodecane, 4,4'-diisocyanatodicyclohexylmethane, 1,6-hexamethylene diisocyanate, 1,12-dodecane diisocyanate, cyclobutane-1,3-diisocyanate, cyclohexane-1,3- and/or 1,4-diisocyanate, 1-isocyanato-3,3, 5-trimethyl-5-isocyanatomethyl cyclohexane (isophorone or IPDI), 2,4-and/or 2,6-hexahydrotoluylene diisocyanate, hexahydro-1,3- and/or 1,4-phenylene diisocyanate, perhydro-2,4'-and/or -4,4'diphenylmethane diisocyanate, 1,3-and/or 1,4-phenylene diisocyanate, 2,4- and/or 2,6-toluylene diisocyanate, diphenyl methane-2,4'-and/or -4,4'-diisocyanate, naphthalene-1,5-diisocyanate, triphenyl methane-4,4',4"-triisocyanate and polyphenyl polymethylene polyisocyanates obtained by phosgenating-aniline/formaldehyde condensation products.

The polyisocyanates of the aqueous adhesive compositions of the present invention can be rendered hydrophilic by reaction with cationic, anionic and/or nonionic compounds containing isocyanate-reactive groups, or by admixture with external emulsifiers, or both, as is known in the art. The NCO functional groups of the polyisocyanate can also be partially or substantially totally blocked using known blocking agents and processes to aid in water dispersibility of the polyisocyanate.

In an especially preferred embodiment of the invention, the water dispersible isocyanate is a methyl ethyl ketone oxime-blocked hexamethylene diisocyanate-based polyisocyanate, commercially available from Bayer. These and other suitable polyisocyanates and adducts thereof and processes for synthesizing the same are described, for example, in U.S. Pat. Nos. 4,433,095; 4,663,377; 4,895,921; 5,157,074; 5,185,200; 5,191,012; 5,200,489; 5,252,696; and 5,296,160, the entire disclosure of each which is hereby incorporated by reference.

The polyisocyanate compound is present in the aqueous adhesive composition in an amount from about 90 to about 10, and preferably about 60 to about 20, percent by weight based upon the total weight of the solid components of the composition. The average NCO functionality of the polyisocyanate can be at least 2, and generally is from 2 to 5. The NCO content of the polyisocyanate compound can be from about 3 and about 30%.

Various additives such as fillers, pigments, dispersion aiding agents, viscosity controlling agents, coating agents, reinforcing agents and the like, may be included in the adhesive compositions in proportions known in the art. Fillers may enhance the viscosity and other properties desirable from the standpoint of application of the adhesive. Fillers include finely divided substantially inert solid materials, like carbon black, silica, titanium dioxide (pigment grade) and zinc oxide.

Preferably the composition is initially substantially devoid of organic solvent. Hydrolysis of the organosilane may occur in which case the by-product alcohol, such as methyl or ethyl alcohol, will be formed and water will be consumed, but such nominal amount of generated alcohol appears not to substantially diminish dispersibility or bonding performance. The amount of water will predominate in the resulting composition. The water used in the compositions of the invention can be derived from any conventional source, for example tap water, deionized water, and the like. The solids content of the adhesive compositions of the invention will generally range from about 1 to about 30, preferably from about 5 to about 20, percent by weight, the balance of the composition being predominantly water.

The adhesive compositions are typically prepared by dispersing the water dispersible polyisocyanate into water and thereafter adding the organosilane. Additional water can be added to provide the desired concentration of solids. The compositions are then typically agitated in a conventional manner, and the amount of shaking or stirring required may vary. The temperature of the composition during agitation can vary from about 5° C. to about 50° C., preferably about 20° C. to about 25° C., and the time of agitation can vary as well, typically from about 4 to about 72 hours.

The adhesive has great versatility, being capable of bonding a wide variety of substrates including metallic, ceramic, glass, and organic substrates. Suitable metallic substrates include any of the common structural metals including iron, steel, including stainless steel, lead, aluminum, copper, brass, bronze, Monel metal, nickel, zinc, and the like. The organic substrates include leather, and all common textile materials such as polyester, polyamide, rayon and cotton fabrics and cords, and the like. The textile substrates can also include glass fibers or filaments.

Such substrates can be bonded using the aqueous adhesive compositions of the invention to a wide variety of vulcanizable elastomers. The compositions are particularly effective in bonding to specialty elastomers that are peroxide (free radically) or sulfur-cured. Such specialty elastomers include peroxide cured silicone, fluorosilicone, fluorocarbon, polyphosphazene and nitrile butadiene rubbers; sulfur- or sulfur-peroxide-cured nitrile butadiene rubbers; and the like.

In general, the adhesive is applied to one or both of the surfaces to be adhered, for example by spraying, dipping, brushing, wiping and the like, and dried by removal of water. The amount of adhesive applied will vary with the application method, material to which applied, and the elastomer to be bonded thereto. Drying may be accomplished under ambient conditions, e.g., room temperature, or by the use of heat or forced air, i.e., from about 20 to 25° C. to about 250° C. and higher. Room temperature drying generally takes about 5 to about 30 minutes, whereas drying at elevated temperatures can vary from about 1 to about 10 minutes.

The adhesive coated substrates may be bonded to elastomers by application of the adhesive coated material to vulcanizable elastomer and curing the elastomer. Curing of the elastomer also causes curing of the adhesive and bonding of the substrate to the elastomer. Depending upon the particular elastomer, curing can be carried out under conventional conditions of temperature, time, and pressure, for example, at temperatures ranging from about 90° C. to about 230° C. for a time commensurate with the temperature employed.

Two or more layers can be bonded together to form a multilayered structure. For example, an adhesive coated material can be sandwiched between and bonded to outer vulcanizable elastomer layers to form a composite multilayer structure. Additional adhesive treated substrates, such as a fabric backing, can also be applied to an outer surface of the multilayered structure.

The present invention will be further illustrated by the following non-limiting examples.

EXAMPLE 1

An aqueous adhesive compositions was prepared using vinyltriethoxysilane and a methyl ethyl ketone oxime-blocked hexamethylene diisocyanate-based polyisocyanate commercially available under the trade designation Bayhydrol BL 116 from Bayer. Bayhydrol BL 116 was first dispersed into water in a ratio of one part of BL 116 to three parts of water. After the BL 116 was fully dispersed, the silane was added slowly and additional water added to reach the desired concentration. The composition was stirred in a closed system at room temperature for at least 48 hours. The resultant formulation included vinyl silane in an amount of about 13.3 weight percent and polyisocyanate in an amount of about 6.67 weight percent. The resulting aqueous composition evidenced no change after six months storage.

EXAMPLE 2

The aqueous adhesive composition prepared as described in Example 1 was used to bond various types of rubbers to zinc phosphate treated steel coupons. The metal coupons were coated by dipping the coupons in an adhesive bath and drying at room temperature for 10 minutes. The adhesive coated coupons were then used to prepare test assemblies.

The test assemblies were placed into contact with ⅛" thick strips of silicone rubber and cured at 190° C. for 2½ minutes. After curing, the elastomer-coupons assemblies were pulled to failure in the peeling mode using an Instron testing machine. The mode of failure is reported below in Table 1 as % of elastomer tearing. The mode of failure was determined by pulling the rubber away from the metal coupon at a peel rate of 2 inch/minute peel rate and a 45 degree peel angle according to ASTM standard D429B. A good bond will result in the rubber tearing and remaining on the metal substrate, i.e., a high percent of failure in the rubber is desirable as this indicates that the adhesive bond is stronger than the rubber itself.

EXAMPLE 3

Environmental resistance of the adhesive was also tested in automotive transmission fluid (ATF) and in a hot oil test. In the ATF test, the bonded samples of Example 2 are immersed in transmission fluid at 150° C. for 70 or 183 hours and the sample thus treated is tested for rubber failure by pulling the rubber body from the metal. In the hot oil test, the bonded samples are immersed in ASTM #1 oil at 150° C. for 70 hours and the sample thus treated is tested for rubber failure by pulling the rubber body from the metal. "Primary adhesion" refers to test results without using ATF or hot oil.

TABLE 1

| Silicone Stocks | Performance (Rubber Retention) |
| --- | --- |
| S49[1] | 100% Rubber, Primary Adhesion |
| S49 | 100% Rubber, ATF @150° C. for 70 hours |
| S49 | 100% Rubber, ATF @150° C. for 183 hours |
| S83[2] | 100% Rubber, Primary Adhesion |
| S83 | 100% Rubber, ATF @150° C. for 70 hours |
| S83 | 95% Rubber, ATF @150° C. for 183 hours |
| LZ 810[3] | 100% Rubber, Primary Adhesion |
| LZ 810 | 97% Rubber, ASTM #1 oil @150° C. for 70 hours |

Notes:
1. S49 is a proprietary material from Federal Mogul.
2. S83 is a proprietary material from Federal Mogul.
3. LZ 810 is a proprietary material from Freduenberg-NOK.

% Rubber indicates the amount of rubber that remains bonded to the substrate after the composite has been destructively tested for bond strength.

The foregoing examples are illustrative of the present invention, and are not to be construed as limiting thereof. The invention is defined by the following claims, with equivalents of the claims to be included therein.

That which is claimed is:

1. An aqueous adhesive composition useful for bonding vulcanizable elastomeric rubbers to a substrate, made from the following ingredients comprising:
   at least one organosilane; and
   at least one water dispersible polyisocyanate.

2. The aqueous adhesive composition of claim 1, wherein said at least one organosilane comprises a vinyl silane.

3. The aqueous adhesive composition of claim 2, wherein said vinyl silane comprises a compound having the formula

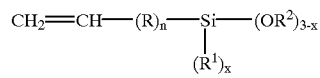

wherein:
   R is selected from the group consisting of divalent aliphatic, cycloaliphatic and aromatic radicals having from 1 to 20 carbon atoms, and n is 0 or 1;
   $R^1$ is selected from the group consisting of monovalent aliphatic, cycloaliphatic and aromatic radicals having from 1 to 20 carbon atoms;
   $R^2$ is selected from the group consisting of monovalent aliphatic, cycloaliphatic and aromatic radicals containing from 1 to 8 carbon atoms; and x is zero or 1.

4. The aqueous adhesive composition of claim 3, wherein:
R is selected from the group consisting of C1–C4 alkylene, C4–C7 cycloalkyl, and C6–C14 aryl, optionally substituted with one or more C1–C4 alkyl, and n is 0 or 1;
x is zero; and
$R^2$ is selected from the group consisting of C1–C4 alkyl, —$R^3$—O—$R^4$— and —C(O)—$R^4$, wherein $R^3$ is C1–C4 alkylene and $R^4$ is C1–C4 alkyl.

5. The aqueous adhesive composition of claim 2, wherein said vinyl silane is selected from the group consisting of vinyltriethoxysilane, vinyltripropyoxysilane, vinyltributoxysilane, vinylmethyldimethoxysilane, vinylmethyldiethoxysilane, vinylethyldimethoxysilane, vinylethyldiethoxysilane, vinylphenyldimethoxysilane, vinylphenyldiethoxysilane, vinylcyclohexyldimethoxysilane, 2-propenyltrimethoxysilane, 2-propenyltriethoxysilane, 2-propenylmethyldiethoxysilane, 2-propenylmethyldimethoxysilane, 2-propenylphenyldiethoxysilane, 2-propenylcyclohexyldimethoxysilane, 3-butenyltrimethoxysilane, 3-butenyltriethoxysilane, 4-pentenyltriethoxysilane, 4-pentenyltrimethoxysilane, 5-hexenetrimethoxysilane, 5-hexenemethyldimethoxysilane, and mixtures thereof.

6. The aqueous adhesive composition of claim 5, wherein said vinyl silane is vinyltriethoxysilane.

7. The aqueous adhesive composition of claim 1, wherein said at least one water-dispersible polyisocyanate is selected from the group consisting of aliphatic polyisocyanates, cycloaliphatic polyisocyanates, adducts thereof and mixtures thereof.

8. The aqueous adhesive composition of claim 7, wherein said at least one water-dispersible polyisocyanate includes at least one NCO functional group and wherein said at least one NCO functional group is blocked.

9. The aqueous adhesive composition of claim 1, wherein said at least one water-dispersible polyisocyanate is 1,6-hexamethylene diisocyanate.

10. An aqueous adhesive composition useful for bonding vulcanizable elastomeric rubbers to a substrate, comprising:
at least one vinyl silane having the formula

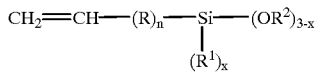

wherein:
R is selected from the group consisting of divalent aliphatic, cycloaliphatic and aromatic radicals having from 1 to 20 carbon atoms, and n is 0 or 1;
$R^1$ is selected from the group consisting of monovalent aliphatic, cycloaliphatic and aromatic radicals having from 1 to 20 carbon atoms;
$R^2$ is selected from the group consisting of monovalent aliphatic, cycloaliphatic and aromatic radicals containing from 1 to 8 carbon atoms; and
x is zero or 1; and
at least one water dispersible polyisocyanate selected from the group consisting of aliphatic polyisocyanates, cycloaliphatic polyisocyanates, adducts thereof and mixtures thereof.

11. An aqueous adhesive composition useful for bonding vulcanizable elastomeric rubbers to a substrate, comprising from about 10 to about 90 percent by weight vinyltriethoxysilane, from about 90 to about 10 percent by weight methyl ethyl ketone oxime-blocked hexamethylene diisocyanate-based polyisocyanate, and water in an amount sufficient to form an aqueous formulation having a total solids content from about 1 to about 30 percent.

12. An article having a vulcanized elastomeric rubber portion thereof, comprising:
a substrate having a surface;
a vulcanizable elastomeric rubber layer adjacent said surface; and
an adhesive layer disposed between and bonding together said substrate and said vulcanizable elastomeric rubber layer, said adhesive made from the following ingredients comprising:
at least one organosilane; and
at least one water dispersible polyisocyanate.

13. The article of claim 12, wherein said substrate is a metal substrate and wherein said vulcanizable elastomeric rubber is selected from the group consisting of silicone rubbers, fluorosilicone rubbers, fluorocarbon rubbers, polyphosphazene rubbers, and nitrile butadiene rubbers.

14. A process for bonding a vulcanizable elastomer rubber to the surface of a substrate, comprising:
applying to a surface of a substrate an aqueous adhesive composition made from the following ingredients comprising at least one organosilane, and at least one water dispersible polyisocyanate;
contacting said surface with a surface of a vulcanizable elastomeric rubber layer, to which the adhesive is optionally applied; and
curing said adhesive and said vulcanizable elastomeric rubber layer to bond said substrate and said vulcanizable elastomeric rubber to form a unitary structure.

15. The aqueous adhesive composition of claim 1 wherein the composition is shelf stable for at least six months.

16. The process according to claim 14 wherein said at least one organosilane comprises a vinyl silane and said at least one water-dispersible polyisocyanate includes at least one NCO functional group and wherein said at least one NCO functional group is blocked.

17. The article according to claim 12 wherein said at least one organosilane comprises a vinyl silane and said at least one water-dispersible polyisocyanate includes at least one NCO functional group and wherein said at least one NCO functional group is blocked.

18. An aqueous adhesive composition useful for bonding vulcanizable elastomeric rubbers to a substrate made by mixing at least one water dispersible polyisocyanate into water and then adding at least one organosilane.

19. An aqueous adhesive composition according to claim 18 wherein said at least one organosilane comprises a vinyl silane and said at least one water-dispersible polyisocyanate includes at least one NCO functional group and wherein said at least one NCO functional group is blocked.

* * * * *